June 29, 1965 G. R. MURPHY 3,191,448
MOTION TRANSMITTING MECHANISM
Filed July 23, 1963

INVENTOR.
GEORGE R. MURPHY
BY A. J. De Angelis
ATTORNEY

United States Patent Office 3,191,448
Patented June 29, 1965

3,191,448
MOTION TRANSMITTING MECHANISM
George R. Murphy, Searcy, Ark., assignor to Sperry Rand Corporation, New York, N.Y., a corporation of Delaware
Filed July 23, 1963, Ser. No. 297,014
7 Claims. (Cl. 74—125)

The present invention relates to motion transmitting mechanisms, and, more particularly, to such mechanisms for selectively transmitting driven motion from a cam.

It is often desirable to transmit motion from a driving cam to one or more rotatable shafts. In certain driving cam arrangements, the cam is mounted on a shaft for rotation, and is configurated to impart to a cam follower predetermined cyclical motion each revolution of the shaft. It is desirable in certain mechanisms that such driving cams impart a partial revolution to a driven gear and a full revolution or more to a driven shaft. In addition, it is often desirable to selectively disengage the driving cam mechanism from the driven mechanism.

It is, therefore, an object of the invention to provide improved motion transmitting mechanism of simple construction for selectively transmitting driven motion from a driving cam to a shaft.

It is a further object to provide such mechanism which is economical to manufacture and operate.

It is another object to provide such mechanism for selectively causing partial revolution of a first gear and the simultaneous full revolution of a second gear.

In carrying out the invention, according to a preferred embodiment, motion imparted to a cam follower by a rotating cam is transmitted through linkage to a pawl. A driven gear is provided with a plurality of protruding studs spaced equally around the gear. The pawl is normally spring biased into position to engage the studs sequentially for driving the gear through a predetermined partial revolution for each full revolution of the driving cam. The driven gear is meshed with a second gear, driving the latter gear a full revolution each rotation of the cam. Mechanism is provided for actuating the pawl against its spring bias out of stud engaging positions, preventing the motion of said driving cam from being imparted to said first and second driven gears.

Figure 1:
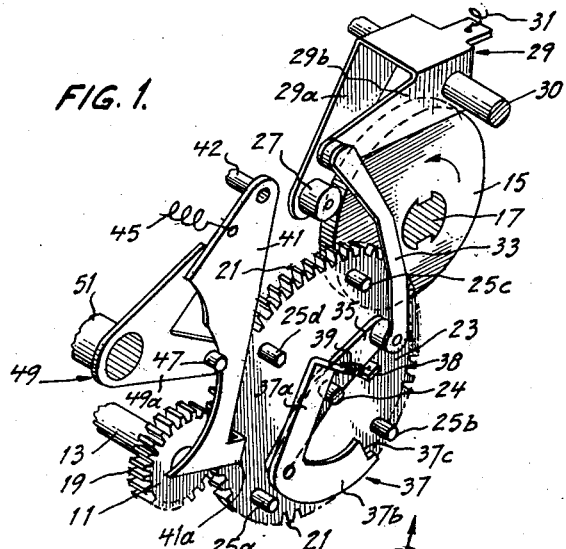
FIG. 1 is a simplified schematic representation in perspective of the subject mechanism, embodying the invention.

Features and advantages of the invention will be seen from the above, from the following description of operation when considered in conjunction with the drawing and from the appended claims.

In FIG. 1, the motion transmitting mechanism is shown for its condition at the beginning of a driving cycle. In the preferred embodiment illustrated, a gear 11 mounted on a shaft 13 is driven one full revolution for each revolution of a driving cam 15 keyed onto shaft 17. Teeth 19 of driven gear 11 are constantly meshed with teeth 21 of an intermediate gear 23. Gear 23 is mounted for rotation on a stub shaft 24 and is provided on one gear face with four axially projecting studs 25a to 25d spaced approximately 90 degrees apart.

A cam follower 29 having two arms 29a and 29b is pivotably mounted on a shaft 30 in position for coaction with cam 15. A roller 27 carried at the end of arm 29a of cam follower 29 is maintained in constant rolling engagement with the camming surface of cam 15 by biasing spring 31 which is attached at one end, under tension, to cam follower 29 urging the cam follower counterclockwise.

The other arm 29b of cam follower 29 is connected by means of a link 33 to one end of a lever 35. Lever 35 is pivotably mounted at its mid point on stub shaft 24 protruding through intermediate gear 23. A bellcrank 37 is pivotably mounted at the other end of lever 35 and is carried thereby.

One arm 37a of bellcrank 37 is connected to one end of a spring 39 which is connected at its other end to a projection 38 protruding from lever 35. Spring 39 is maintained under tension and biases bellcrank 37 clockwise, causing bellcrank arm 37a to limit against the protruding end of stub shaft 24. Formed on the free end of the other arm 37b of bellcrank 37 is a stud engaging pawl 37c for engaging studs 25a to 25d protruding from intermediate gear 23 to transmit motion thereto, as will be explained hereinafter.

Figure 3:
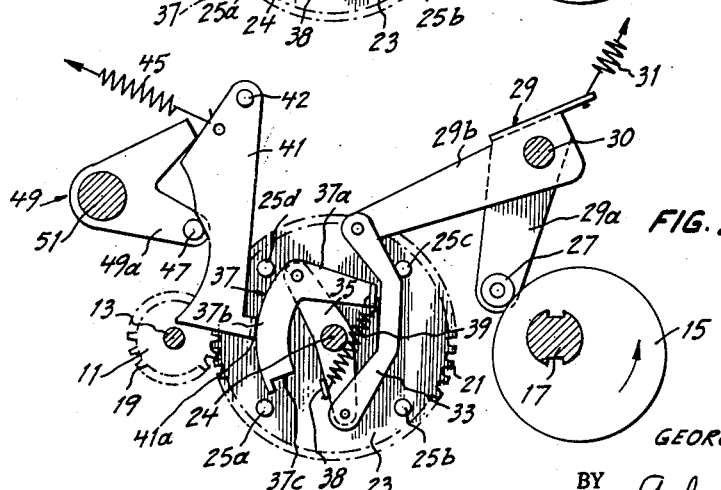
FIG. 3 is a view similar to that of FIG. 2, showing the mechanism in another operating condition.

Mechanism for preventing transmission of motion from driving cam 15 to driven gear 11 is provided and consists of a lever 41 pivoted at one end at 42 and biased by spring 45 (under tension) clockwise against stop 47 protruding from one arm 49a of a bellcrank 49. Bellcrank 49 is pivoted at 51 and may be driven by mechanism (not shown) counterclockwise (FIG. 3) to actuate lever 41 (against the force of biasing spring 45) counterclockwise to place a foot 41a formed on the lever into the path of movement of the stud engaging arm 37b of bellcrank 37.

In operation, cam 15 is rotated counterclockwise at the start of a cycle, as is indicated by the directional arrow. Cam roller 27 of cam follower 29 rides on the cam surface; the surface configuration causing cam follower 29 to pivot counterclockwise. Motion of cam follower 29 is transmitted through link 33 to lever 35, causing lever 35 to rotate clockwise. Clockwise movement of lever 35, in turn, carries stud engaging bellcrank 37 clockwise.

Figure 2:
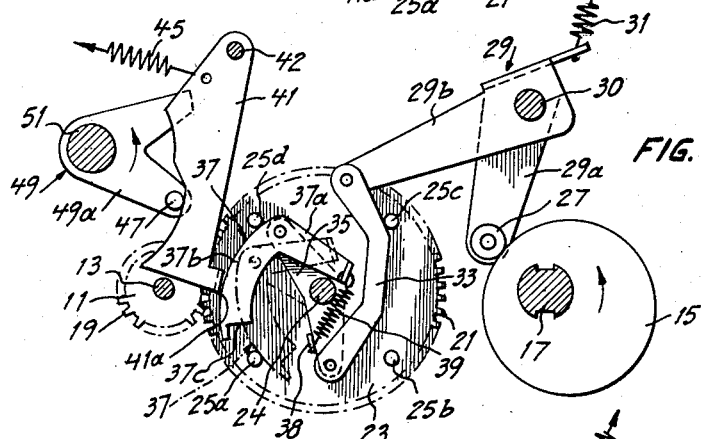
FIG. 2 is a front elevational view of the mechanism of FIG. 1, showing the mechanism in one operated condition.

Arm 37b of bellcrank 37 in moving clockwise engages the adjacent fixed stud 25a (FIG. 2), projecting from intermediate gear 23. Continued relative movement between stud 25a and arm 37b urges the bellcrank 37 counterclockwise against the bias of spring 39, causing arm 37b to "ride over" stud 25a, as is shown in broken line outline in FIG. 2.

As arm 37b of bellcrank 37 moves clockwise past stud 25a, and is released thereby, spring 39 urges bellcrank 37 clockwise about tis pivot until bellcrank arm 37a limits against stub shaft 24. This movement places pawl portion 37c of bellcrank 37 in "pick up" position (FIG. 2) in preparation for engaging stud 25a for coupling cam follower 29 to intermediate gear 23 which remains standing still in a dwell during this part of the cycle.

As cam 15 continues to rotate counterclockwise, cam follower 29 is driven clockwise by the cam surface. Such clockwise movement of cam follower 29 is transmitted through link 33 to lever 35, causing the latter to rotate counterclockwise. Counterclockwise rotation of lever 35 carries bellcrank 37 counterclockwise, causing its pawl portion 37 to engage stud 25a, coupling cam follower 29 to intermediate gear 23. The configuration of the camming surface of cam 15 and the number of teeth provided on gears 11 and 23 are predetermined to cause bellcrank 37 to drive intermeditae gear 23 by means of stud 25a one quarter revolution or a distance sufficient to rotate gear 11 in this order part of the cycle between dwells one full revolution. Thus, for each revolution of driving cam 15 driven gear 11 is rotated one full revolution.

Next assume that it is desired to prevent rotation of driven gear 11 during certain portions of the machine cycle. To accomplish this, bellcrank 49 is rotated counterclockwise by mechanism (not shown), urging lever 41 counterclockwise from its rest position (FIGS. 1 and 2) against the bias of its spring 45 into position (FIG. 3) to engage arm 37b of bellcrank 37. With lever 41 in such position, as bellcrank 37 is carried clockwise by link 33 and cam follower 29 during the first portion of the machine cycle, as was previously described, foot 41a on lever 41a on lever 41 engages arm 37b of bellcrank 37, rotating bellcrank 37 counterclockwise about its pivot against the bias of spring 39 to a position (FIG. 3) where it clears studs 25a through 25b. When bellcrank 37 is carried by lever 35 counterclockwise later in the machine cycle as was previously described, pawl portion 37c does not engage stud 25a but passes over the stud. Thus, the transmission of driving motoin from driving cam 15 to intermediate gear 23, and, in turn, driven gear 11 is prevented.

As changes can be made in the above described construction and many apparently different embodiments of this invention can be made without departing from the scope there of, it is intended that all matter contained in the above description or shown on the accompanying drawing be interpreted as illustrative only and not in a limiting sense.

What is claimed is:

1. A motion transmitting mechanism comprising, a driven gear, a driving cam, cam follower means actuated into motion by said driving cam, an intermediate gear constantly meshed with said driven gear and provided with a plurality of axially projecting studs angularly spaced one from the other, a pivotably mounted pawl movable into and out of stud engaging position, linkage means operatively connecting said cam follower means and said pawl, said cam being configured to actuate said pawl through said linkage into said stud engaging position and to drive said engaged stud for transmitting said cam follower motion to drive said driven gear with said intermediate gear, and means actuatable for controlling said transmitting by selectively urging said pawl out of and into said stud engaging position.

2. Motion transmitting mechanism comprising, a driven gear and an intermediate gear rotatable about an axis, said gears being constantly meshed one with the other, said intermediate gear being provided with a plurality of studs projecting axially from one face of said intermediate gear and being spaced apart predetermined angular distances one from the other, a lever pivoted at said axis between its two arms and rotatable relative to said intermediate gear, a driving cam having cyclic motion, a cam follower actuated by said driving cam, linkage connecting said cam follower to one arm of said lever, a bellcrank having a stud engaging pawl portion formed on the end of one arm of said bellcrank, said bellcrank being pivotably mounted on the other arm of said lever and carried thereby, said cam being configured to actuate said lever to place said pawl portion of said bellcrank into stud engaging position to engage said studs sequentially to couple said driving cam intermittently to said intermediate gear, and means for actuating said bellcrank to pivot said pawl portion into said out of stud engaging position for respectively transmitting and preventing transmission of said driving cam motion to said intermediate gear and, in turn, to said driven gear.

3. Motion transmitting mechanism as set forth in claim 2, wherein said driving cam is substantially of an eccentric circular configuration mounted for rotation about an axis, said cam being provided with a predetermined peripheral camming surface, and wherein said cam follower comprises a bellcrank having two arms and a roller carried by one of said bellcrank arms for rolling engagement with the peripheral camming surface of said driving cam, and wherein the other arm of said cam follower is pivotably connected to said linkage for transmitting motion to said lever.

4. Motion transmitting mechanism as set forth in claim 3 wherein a biasing spring biases said cam follower to maintain said cam roller in constant rolling engagement with said peripheral camming surface of said driving cam.

5. Motion transmitting mechanism as set forth in claim 2 wherein is included a stop and a spring connected under tension between said bellcrank and said lever for biasing said bellcrank against said stop into stud engaging position, and wherein said driving cam has a motion of one full revolution and is configured to cause said lever in part of said motion to pivot and carry said bellcrank in a first direction past an adjacent one of said studs causing said pawl portion of said bellcrank to ride over the said adjacent stud and said gears to stand in a dwell, said stud rotating said bellcrank relative to said lever in a first direction against the bias of said spring, and wherein further driving motion of said cam is transmitted by said linkage to said lever causing said lever to rotate in a direction opposite to said first direction placing said pawl portion of said bellcrank into coupling engagement with said one adjacent stud and causing said driven gear after said dwell to turn one full revolution.

6. Motion transmitting mechanism comprising; a driven gear; an intermediate gear, said gears being constantly meshed one with the other and being constructed such that said driven gear revolves four revolutions for each revolution of said intermediate gear, said intermediate gear being provided with four studs projecting axially from one face of said intermediate gear and being spaced apart 90 degrees one from the other; a lever pivoted at its midpoint at the center of rotation of said intermediate gear and rotatable relative thereto; a driving cam; a cam follower actuated by said driving cam operable in a cycle of motion, linkage means connecting said cam follower to one arm of said lever; a bellcrank having a stud engaging pawl portion, said bellcrank being pivotably mounted on the other arm of said lever and carried thereby, a spring normally biasing said bellcrank into position to engage said pawl portion with a stud, said cam being configurated to actuate said lever to place said pawl portion of said bellcrank into stud engaging position to engage said studs sequentially intermittently coupling said driving cam to said intermediate gear, and means for actuating said bellcrank about its mid point to pivot into and out of stud engaging position for respectively transmitting and preventing transmission of said driving cam motion to said intermediate gear and, in turn, to said driven gear.

7. A motion transmitting mechanism comprising a driven gear and an intermediate gear meshing to drive said driven gear in a full revolution for a partial revolution of said intermediate gear about its axis, a plurality of studs equally spaced around said axis and axially projecting from said intermediate gear, a driving cam, a cam follower actuatable into oscillatory motion by said driving cam, linkage operatively connecting said cam follower to said studs sequentially, said linkage including a lever mounted for pivoting about said axis, a bias and a pawl connected to each other and mounted on said lever, said pawl pivoting on said lever under said bias into stud engaging position and against said bias out of said position, said cam being configurated so said cam follower in one direction of said motion actuates said pawl out of said stud engaging position with respect to first one and then the other of adjacent studs while allowing said gears to stand in a dwell, and in the opposite direction of said motion said follower actuates said pawl into said position to drive said other engaged stud and intermediate gear and effect said gear revolutions adjacent said dwell, and control means cooperable with said pawl for selectively pivoting said pawl against said bias before said follower actuates said pawl into said position.

References Cited by the Examiner

IBM Technical Disclosure Bulletin, vol. 4, No. 2, page 18, July 1961, published by International Business Machines Corporation, New York, N.Y.

BROUGHTON G. DURHAM, *Primary Examiner.*

UNITED STATES PATENT OFFICE
CERTIFICATE OF CORRECTION

Patent No. 3,191,448                              June 29, 1965

George R. Murphy

It is hereby certified that error appears in the above numbered patent requiring correction and that the said Letters Patent should read as corrected below.

Column 2, line 48, for "tis" read -- its --; column 3, line 7, strike out "41a on lever"; line 14, for "motoin" read -- motion --; same column 3, line 58, for "said" read -- and --.

Signed and sealed this 16th day of November 1965.

(SEAL)
Attest:

ERNEST W. SWIDER
Attesting Officer

EDWARD J. BRENNER
Commissioner of Patents